United States Patent [19]

Ban

[11] 3,827,082

[45] July 30, 1974

[54] RECORD TRACK INDICATOR APPARATUS FOR A MULTITRACK TAPE PLAYER

[76] Inventor: Itsuki Ban, 829, Higashi Oizumimachi, Nerima-ku, Tokyo, Japan

[22] Filed: May 25, 1972

[21] Appl. No.: 256,934

[52] U.S. Cl. .......................................... 360/106
[51] Int. Cl. .......................................... G11b 21/08
[58] Field of Search .......................... 274/4 F, 4 A; 179/100.2 CA

[56] References Cited

UNITED STATES PATENTS

| | | | |
|---|---|---|---|
| 3,477,725 | 11/1969 | Housman | 274/4 A |
| 3,532,833 | 10/1970 | Suzuki | 179/100.2 CA |
| 3,544,114 | 12/1970 | Malone | 274/4 A |

*Primary Examiner*—Bernard Konick
*Assistant Examiner*—David K. Moore
*Attorney, Agent, or Firm*—Eric H. Waters

[57] ABSTRACT

A record track indicator apparatus for a multitrack magnetic tape player comprising a rotary cam for shifting a magnetic head in alignment with record tracks on the tape across the width of the tape, a rotary member rotatable in relation to rotation of the rotary cam, a flexible string member connected to the rotary member and adapted to be taken up by the rotary member when rotated, bias means for exerting tension on the flexible string member in a direction reverse to that applied by the rotary member, and an indicator member movable by the flexible member upon rotation of the rotary member to identify the record track to be played due to its displacement. The rotary member is rotated a predetermined amount and freed from the cam and reversedly rotated to its original position under the bias of the bias means simultaneously with movably returning the indicator member to its original position.

5 Claims, 5 Drawing Figures

PATENTED JUL 30 1974 3,827,082

RECORD TRACK INDICATOR APPARATUS FOR A MULTITRACK TAPE PLAYER

BACKGROUND OF THE INVENTION

The present invention relates to a multitrack magnetic player, and more particularly to an apparatus for indicating the record track or channel to be played on the magnetic tape.

In an endless magnetic player of the type in which a tape cartridge which contains an endless magnetic tape with a plurality of record tracks or channels is played, the record track to be played is successively changed over whenever the tape completes one cycle. The change-over of the track to be played is, in general, effected by a shifting mechanism which allows the magnetic head to move in step-by-step relation across the tracks. Such shifting mechanism generally comprises a rotary cam for shifting the magnetic head into coincidence with record tracks on the tape across the width of the tape, a ratchet wheel mounted coaxially with the cam, and a solenoid having an actuator which is reciprocally moved to rotatably drive the ratchet wheel step by step through a pawl member. Normally, the tape player is provided with means for indicating which record track or channel is played when the magnetic head is shifted by the shifting mechanism.

Various types of record track indicating apparatus have been heretofore proposed for a tape player. One type of the record track indicating apparatus is a so called "lamp indicator means" which is so adapted that lamps corresponding to the record tracks are selectively lit to indicate which track or channel is being played. This is done by means of a rotary switch which is changed over by rotation of a rotary cam of the aforementioned magnetic head shifting mechanism. Aternatively, a lever is mounted to be swingable synchronously with rotation of the rotary cam to thus allow its one end to point to digits such as "1," "2," "3," and "4" graduated on a record player panel so as to correspond to associated record tracks or channels whereby the record track or channel being played may be determined.

Use of the lamp makes it possible to choose any position with respect to a tape player cabinet but requires electrical power and involves difficulty in viewing in daylight. The requirement for electrical power makes it unfeasible for use in a portable tape player which relies on a dry battery as its power source. On the other hand, the combination of the lever with the digits requires no current and is a simple arrangement but it is structurally limited in its position to the front panel of the tape player cabinet and it generally requires substantial space.

SUMMARY OF THE INVENTION

It is a primary object of the invention to provide a novel record track indicator apparatus for a multitrack magnetic tape player wherein the angle position assumed by the rotary cam which shifts the magnetic head is searched and imparted to a prescribed section by a flexible string member, for example, a steel belt, nylon yarn or the like to indicate which of a plurality of record tracks or channels on the magnetic tape is being played.

Another object of the invention is to provide a record track indicator apparatus for a multitrack magnetic tape player wherein indicator means such as digits "1,"

"2," "3," and "4" graduated corresponding to record tracks or channels on the tape is moved by the flexible string member in response to a rotational angle of the rotary cam whereby a record track or channel to be played may be identified by the digit viewed at a predetermined position or through a window disposed on a panel of the tape player cabinet.

A further object of the invention is to provide a record track indicator apparatus for a multitrack magnetic tape player wherein for instance, the magnetic head is shifted from an uppermost position to a lowermost position by one revolution of the rotary cam to automatically return the indicator means to its original position, that is, the digit "1" is viewed through the window.

Still another object of the invention is to provide a record track indicator apparatus for a multitrack magnetic tape player, which comprises linearly movable indicator means in the form of an elongated plate member, and digits graduated thereon corresponding to the record tracks or channels on the magnetic tape.

Yet another object of the invention is to provide a record track indicator apparatus for a multitrack magnetic tape player, which comprises indicator means in the form of a cylinder or column that is rotatable in association with shifting of the magnetic head, and digits graduated on the periphery of the cylinder corresponding to record tracks or channels on the magnetic tape.

According to the record track indicator apparatus of the present invention, the rotational angle assumed by the rotary cam which shifts the magnetic head may be imparted to the indicator means by the flexible string member so that the indicator position can be freely selected as opposed to the lever means of the prior art and the apparatus can be employed in a tape player operating on battery power due to the minimum requirement of power.

Further objects and advantages of the invention will become more readily apparent to one skilled in the art from the following detailed description and drawings, in which:

DESCRIPTION OF THE PREFERRED EMBODIMENTS

Figure 1:
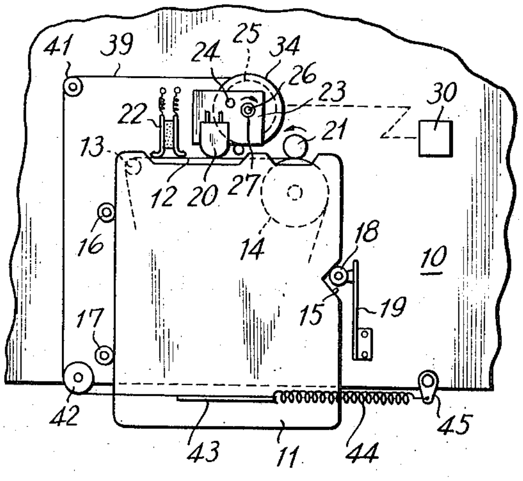
FIG. 1 is a diagrammatic plan view showing a multitrack tape player employing apparatus according to the present invention.

Referring now to the drawing, and in particular to FIG. 1, the reference numeral 10 designates a horizontal player deck within a cabinet (not shown) for a multitrack endless magnetic tape cartridge player. A guideway is provided on the deck 10 for an endless magnetic tape cartridge 11 while guide members 16, 17 and 18 are mounted on the deck for holding the cartridge in the operative position. The guide member or retention roller 18 is connected to a leaf spring 19 one end of which is rigidly connected to the deck 10. The guide member 18 is pressed into a notch 15 on the side of the cartridge 11. Pressure of the retention roller 18 against the inclined wall of the notch 15 in the cartridge imparts a forward force on the cartridge to bring the latter into the operative position with respect to a magnetic head 20 and a rotary capstan 21.

The cartridge 11 comprises a generally rectangular housing which contains therein an endless magnetic tape 12 helically wound in a conventional manner, a tape guide 13 and a pinch roller 14 for driving the tape in cooperation with the capstan 21. Mounted on the deck 10 are the capstan 21, the magnetic head 20 adapted to contact the tape 12, and an end selection or sensing member 22 having a pair of feeler contacts which are shorted by a conductive foil (not shown) as an end to tape indicator on the tape 12. These members mentioned above are so mounted on the deck 10 to face the front edge of the cartridge 11 positioned in the operative position. The capstan 21 is connected to an electrical motor (not shown) and rotatably driven at a preset constant speed. The tape 12 which is driven by operation of the pinch roller 14 and the capstan 21 is transported along the detector 22 and the magnetic head 20.

Figure 4:
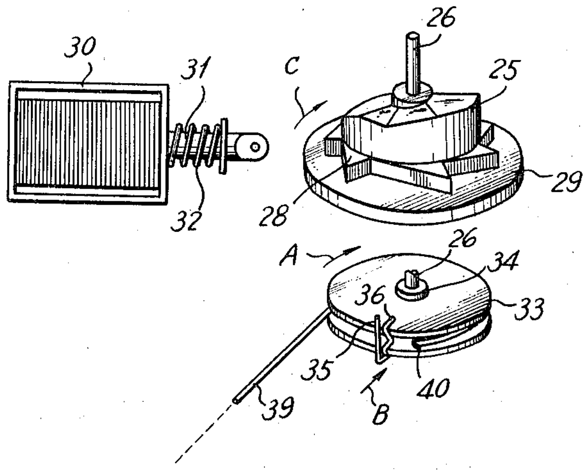
FIG. 4 is an exploded perspective view of a rotary cam for shifting a magnetic head, and an associated member.

By means of a mechanism for shifting the magnetic head, the head 20 may be positioned at a plurality of different predetermined fixed locations across the width of the tape 12, thereby reproducing a plurality of discrete and separate record tracks upon the tape at these locations. The magnetic head 20 is firmly secured to a displaceable support plate or leaf spring 23 of which one end portion is fixed to a stationary member (not shown) on the deck 10. A threaded pin 24 is held in a threaded aperture (not shown) of the support plate 23. The bottom end of the threaded pin 24 is arranged to ride on a rotary face cam 25 (FIG. 4). The displaceable support plate 23 is intended to allow its free end to move downwardly under its inherent elasticity to maintain the pin 24 against the rotary face cam 25 in operative relation. The rotary face cam 25 comprises a plurality of flat steps which are different in height and arranged along the periphery of the cam to correspond to each record track on the tape 12. Ramps are provided between the flat steps of the cam 25. The lowest flat step of the cam 25 positions the magnetic head 20 at the lowest record track on the tape 12. The threaded pin 24 is adapted to cause the head to assume this position. When the cam 25 is rotatably driven by one step by a driving means as will be described later, the threaded pin 24 rides up the adjacent ramps to the next flat step of the cam. The details of the driving means will be understood from the following description by reference to FIG. 4. Similar numerals are used in FIGS. 1 and 4 to illustrate like parts. The cam 25 is rotatably supported at its lower end by a suitable bearing (not shown) and mounted on a shaft 26 which passes through an aperture 27 formed in the displaceable support plate 23 and vertically extends upwardly thereof. The shaft 26 functions as a pivot for the cam 25 and as a guide for the displaceable support plate 23 when it is moved up and down. A ratchet wheel 28 and a disc 29 are integrally formed with the cam 25 and fixed to the shaft 26. A solenoid 30 is mounted in opposition to the ratchet wheel 28 for rotatably driving the wheel 28. The solenoid 30 has an actuator 31 which is reciprocally moved to rotatably drive the ratchet wheel step by step through the intermediary of a pawl member (not shown). The solenoid 30 is electrically connected through a parallel connection with the end of tape detector 22 and a manual pushbutton switch (not shown) to an electrical source (not shown). As a consequence of this construction, the solenoid is energized either when a pair of mutually insulated feeler contacts of the detector 22 are shorted by the conductive patch (not shown) on the tape 12 or by manual closure of the pushbutton switch. The current is fed to the solenoid in pulse fashion by the operation of detector 22 or the pushbutton switch (not shown) to move the actuator 31 against the bias of a spring 32. Thus, the ratchet wheel 28 is rotated in a conventional manner by one tooth in the direction of arrow C. The ratched wheel 28 is further rotated one tooth in the same direction by the restoring bias of the spring 32 by shutting off the current to the solenoid. In other words, the ratchet wheel 28 is to be rotated by two teeth whenever the solenoid 30 is supplied with current in pulse fashion. In the instance shown in the drawing, the teeth of the ratchet wheel 28 are eight in number to allow the wheel to intermittently rotate by 90°. It will be readily understood that the cam 25 is rotated with rotation of the ratchet wheel 28 to shift the magnetic head 20. More specifically, the magnetic head 20 is moved up or down over four stages when the cam 25 is rotated by one revolution, and is thus shifted to a position where one of the four record tracks or channels on the tape 12 is reproduced. That is, the tracks may be successively played from the first to the fourth to complete one cycle and repeat the same cycle.

The record track indicator apparatus according to the invention includes a rotary member or pulley 33 which is rotated with rotation of the rotary cam 25. The rotary member or pulley 33 is rotatably supported by a sleeve 34 over the shaft 26 so as to face the rear or lower surface of the disc 29. An L-shaped elastic engaging member 35 made of piano wire is connected at one end to the pulley 33 to extend along the periphery thereof. The L-shaped engaging member 35 is normally positioned outwardly of the pulley 33 and adapted to be received in a groove 36 formed in the pulley 33 when it is urged in the direction of the arrow B as will be more fully described hereinafter.

Figure 5:
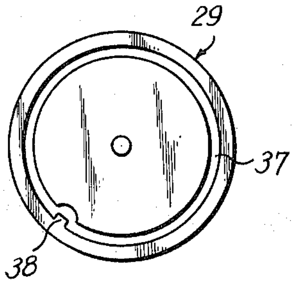
FIG. 5 is a rear view of the disc shown in FIG. 4.

As shown in FIG. 5, the disc 29 is provided at its rear side with an annular groove 37 and a boss 38 extending from the peripheral rim defined by the groove 37. The other end of the L-shaped member 35 is adapted to be inserted into the annular groove 37 and is normally engaged by the boss 38 to thus normally rotate the pulley 33 in the direction of the arrow A as the cam 25 and disc 29 are rotated.

One end 40 of a flexible string member 39, such as nylon yarn, is connected to the pulley 33. The member 39 is led over guides 41, 42 on the deck 10, as shown in FIG. 1, inwardly of a front panel (designated at 46 in FIG. 2) of the player cabinet to allow its other end to be connected with an elongated indicator member 43 in the form of a plate. Digits such as "1," "2," "3," and "4" are graduated on the indicator member 43 at the surface thereof so as to correspond to the associated four record tracks or channels on the tape 12. A tension spring 44 is connected to the indicator member 43 (at that end opposite the end to which the string member is connected) and to a hook member 45 provided on the deck 10. The indicator member 43 is normally urged by the bias of the tension spring 44 in the rightward direction in FIGS. 1 and 2. For instance, when the first record track or channel on the tape 12 is reproduced, a relative position of the indicator member 43 with respect to the window 47 is so determined that the digit "1" on the indicator member 43 can be viewed through the window in the front panel 46 of the player cabinet. Upon completion of play of the first record track on the tape 12, the magnetic head 20 is shifted by rotation of the rotary cam 25 so as to play the second track on the tape thereby rotating the pulley 33 in the direction of the arrow A. Upon rotation of the pulley 33, a portion of the string member 39 is taken up by the pulley 33 to move the indicator member 43 against the bias of the tension spring 44 in the leftward direction in FIGS. 1 and 2 to thus align the digit "2" and the window 47. In this manner, the record track or channel being played can be determined by identification of the digit viewed through the window. Upon completion of the play of the last or fourth record track or channel on the tape 12, the cam 25 is rotated so as to play the first record track on the tape in the next cycle whereby the cam 25 and the pulley 33 have made one revolution from their original positions. In fact, a portion of the string member 39 which has been taken up by the pulley 33 urges the engaging member 35 in the direction of the arrow B just short of one revolution of the pulley 33. The engaging member 35 when depressed by the string member 39 is allowed to disengage its end from the boss 38 extending into the annular groove 37 in the disc 29. As a result, the pulley 33 is rotated in a direction reverse to that of the arrow A by the bias of the tension spring 44 through the string member 39 and the indicator member 43. That is, the rotary member or pulley 33 whenever rotated by one revolution is reversedly rotated as it becomes freed from the cam 25 by action of a clutch means inclusive of the engaging member 35 and is thus returned to its original position. With this arrangement, when the fourth record track or channel is completely played and the magnetic head 20 is shifted to a position for playing the first track on the tape, the digit which is viewed through the window 47 is changed from "4" to "1".

Figure 2:
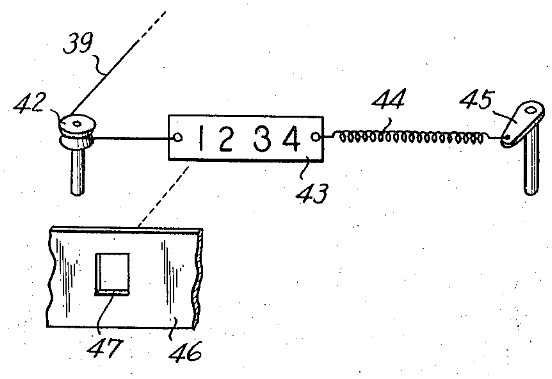
FIG. 2 is a perspective view fragmentarily showing one embodiment of the record track indicator apparatus in accordance with the present invention.
Figure 3:
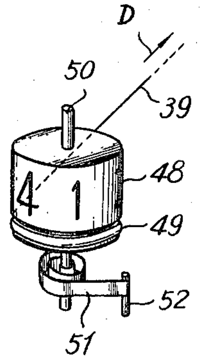
FIG. 3 is a perspective view partially showing another embodiment of the apparatus of the invention.

The indicator member 43 for the apparatus is shown in FIGS. 1 and 2 as being reciprocated by rotation of the rotary member or pulley 33 and by the bias of the tension spring 44 whereas it is shown in FIG. 3 as a rotary type mechanism.

The indicator member shown in FIG. 3 designated by 48 is in the form of a drum and includes the digits graduated on the drum at the periphery thereof so as to correspond to the associated record tracks on the tape 12. The indicator member or drum 48 is provided with an annular groove 49 formed at the lower end of the drum. The string member 39 as aforementioned is connected at one end in the groove and adapted to wind about the drum. The drum 48 is mounted on a shaft 50 which is rotatably supported by a suitable bearing (not shown) on the player deck 10. A spiral spring 51 is coupled to the shaft 50 at one end and fixed to a pin 52 on the player deck 10 at its other end to normally urge the shaft 50 in the counter clockwise direction. The pulley 33 is rotated with rotation of the rotary cam 25 to allow the pulley 33 to take up the string member 39. In this manner, the string member 39 is pulled in the direction of the arrow D to clockwise rotate the drum 48 against the bias of the spiral spring 51 thereby shifting the digit which is graduated on the drum and viewed through the window in the panel of the player cabinet. For instance, in FIG. 3 the digit "4" on the drum 48 is viewed through the window, and when the cam 25 is rotated to shift the track on the tape from the fourth to the first to be played, then, the pulley 33, as mentioned above, is freed from the disc 29 and the drum 48 is rotated counterclockwise by the bias of the spiral spring 51 thereby positioning the digit "1" at the window. This is readily understood from the foregoing description as to the cluch means.

In one embodiment of the invention, the rotary member 33 is adapted to be freed from the cam 25 and reversedly rotated when the engaging member 35 is depressed by the string member 39. Alternatively, the engaging member 35 may be adapted to abut against the boss, or the like, on the deck and then be depressed thereby when the rotary member or pulley 33 is rotated by one revolution. The track indicator apparatus according to the invention may be employed in the well known multitrack magnetic tape recording and reproducing apparatus of the type of reel to reel as well as the endless magnetic tape player. The mechanism for shifting the magnetic head provided by the invention may be used in the apparatus shown in U.S. Pat. No. 3,628,796.

Instead of an indicator member in the form of a plate or drum, a transparent plastic or glass plate may be provided on the front panel of the player cabinet to undergo graduated movement along the digits thereon so as to correspond to the associated record tracks. On the other hand, a pointer can be mounted on the string member to point to the digit to thus identify the played record track when the rotary cam is rotated to move the pointer.

As precisely set forth, according to the invention, rotation of the rotary cam positioned in a relatively inner portion of the player can be imparted to the indicator member by the flexible string member to identify the record track at any optional position on the player front panel while also allowing free selection of the size of the indicator member.

While the invention has been shown and described in preferred embodiments, many changes and modifications may be made without departing from the scope and spirit of the invention as defined in the appended claims.

What is claimed is:

1. A record track indicator apparatus for a multitrack magnetic tape player including a mechanism for driving a magnetic tape, at least one magnetic head adapted to transduce the tape, a rotary cam for shifting the magnetic head in correspondence with record tracks on the tape across the width of the tape and cam driving means for rotating the cam in single steps to position the magnetic head to successive record track positions, said track indicator apparatus comprising:

a rotary member adapted to be rotated with rotation of said rotary cam;

clutch means for freeing the rotary member from said rotary cam in response to a predetermined rotation of the rotary member;

a flexible member coupled to the rotary member and taken up thereby when rotated;

bias means for exerting tension on the flexible member in a direction reverse to the direction by which the flexible member is taken up by the rotary member;

an indicator member coupled to the flexible member and moved when the flexible member is taken up by the rotary member, said indicator member being moved by the rotary member through the flexible member when said magnetic head is shifted upon rotation of said rotary member thereby identifying the record track on the magnetic tape which is transduced by the magnetic head, said clutch means allowing the rotary member to be freed from the rotary cam upon predetermined rotation of the rotary member from a predetermined original position whereby the rotary member is reversedly returned to its original position by said bias means through the flexible member at the same time the indicator member is returned to a predetermined original position.

2. A record track indicator apparatus in accordance with claim 1, wherein said indicator member comprises an elongated plate with a plurality of digits graduated thereon so as to correspond to the associated record tracks on the tape and is longitudinally moved by said flexible member upon rotation of the rotary member.

3. A record track indicator apparatus in accordance with claim 2, wherein said bias means comprises a tension spring which is connected by said indicator member to said flexible member.

4. A record track indicator apparatus in accordance with claim 1, wherein said indicator member comprises a drum with digits graduated along with the periphery thereof so as to correspond to the associated record tracks on the tape, and wherein said bias means is a spiral spring coupled to the drum such that a rotational force is applied to the drum in a direction reverse to that by which it is rotated by said flexible member upon rotation of said rotary member.

5. A record track indicator apparatus in accordance with claim 4, wherein said clutch means comprises an elastic engaging member one end of which is fixed to said rotary member, a disc bodily rotatable with said rotary cam and mounted in facing relation to the rotary member, an annular groove provided in the disc at the side adjacent the rotary member to receive therein the free end of the engaging member, and a boss on the disc extending in a portion of the annular groove and normally engageable with the free end of the engaging member, the rotary member being normally rotated with rotation of the disc by engagement of the boss with the engaging member, the engaging member being depressed by a portion of the flexible member taken up by the rotary member when it has made about one rotation into a position where the engaging member is disengaged from the boss whereby the rotary member is freed from the disc and is reversedly rotated by said bias means to a position where the engaging member is again engaged by the boss.

* * * * *